(No Model.) 6 Sheets—Sheet 1.

J. W. HAYES.
ROTARY ENGINE.

No. 444,834. Patented Jan. 20, 1891.

WITNESSES.
Ellen B. Tomlinson
John H. Taylor

INVENTOR.
John W. Hayes
by Alex. P. Browne,
attorney.

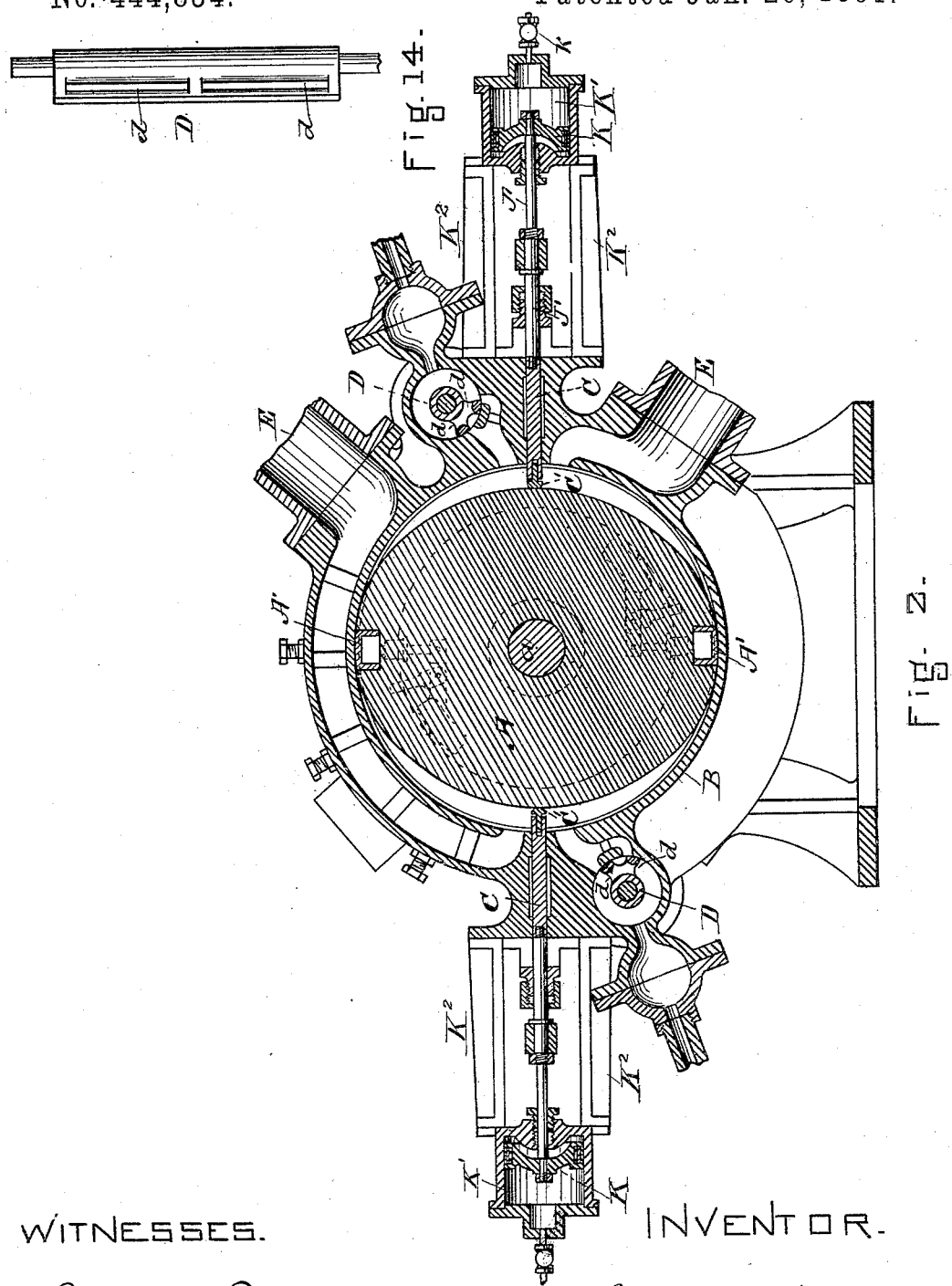

(No Model.)  6 Sheets—Sheet 3.

J. W. HAYES.
ROTARY ENGINE.

No. 444,834. Patented Jan. 20, 1891.

WITNESSES.
Ellen B. Tomlinson.
John H. Taylor

INVENTOR.
John W. Hayes
by Alex. P. Browne,
attorney.

THE NORRIS PETERS CO., PHOTO-LITHO., WASHINGTON, D. C.

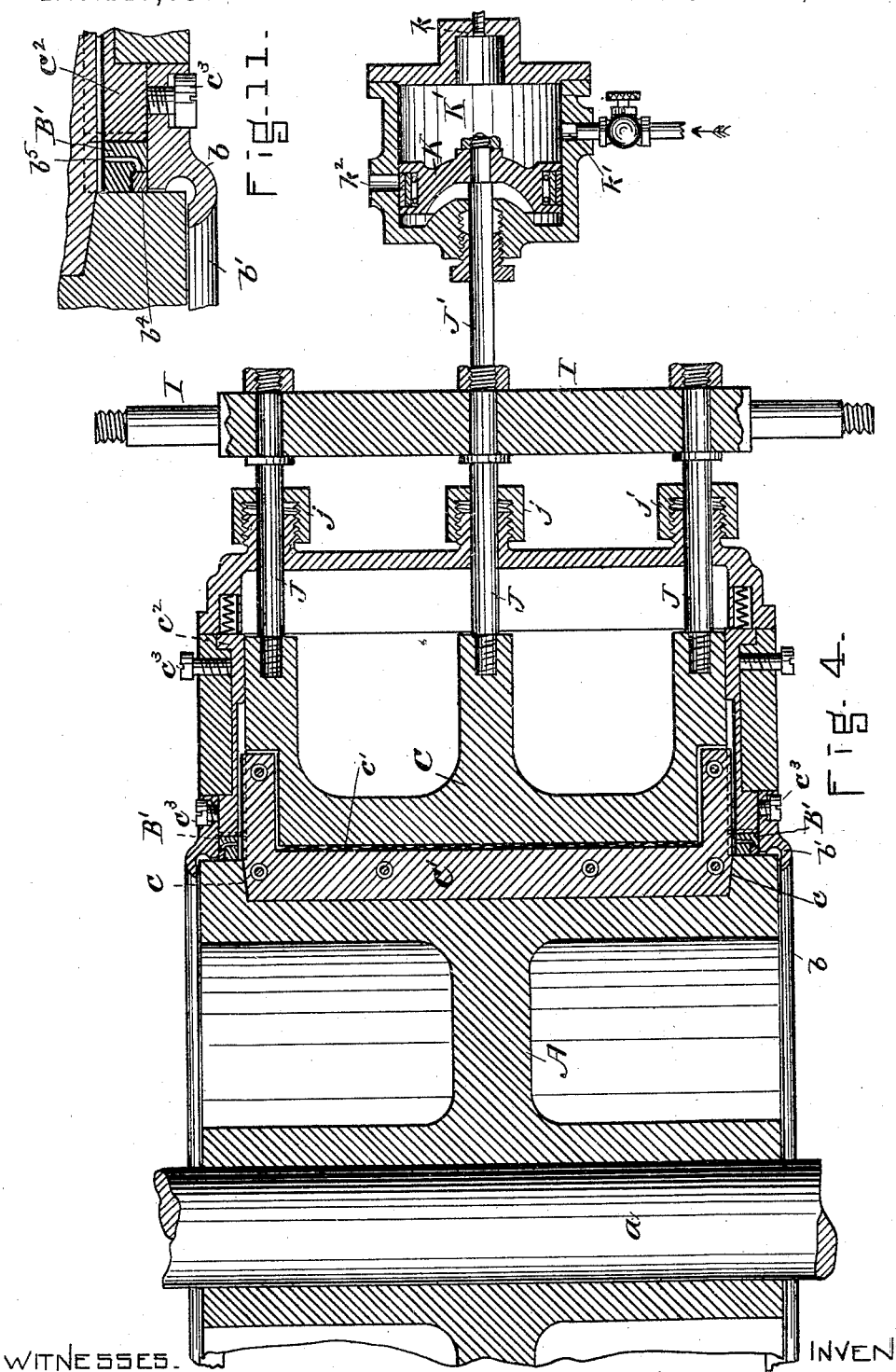

(No Model.) 6 Sheets—Sheet 5.
J. W. HAYES.
ROTARY ENGINE.
No. 444,834. Patented Jan. 20, 1891.
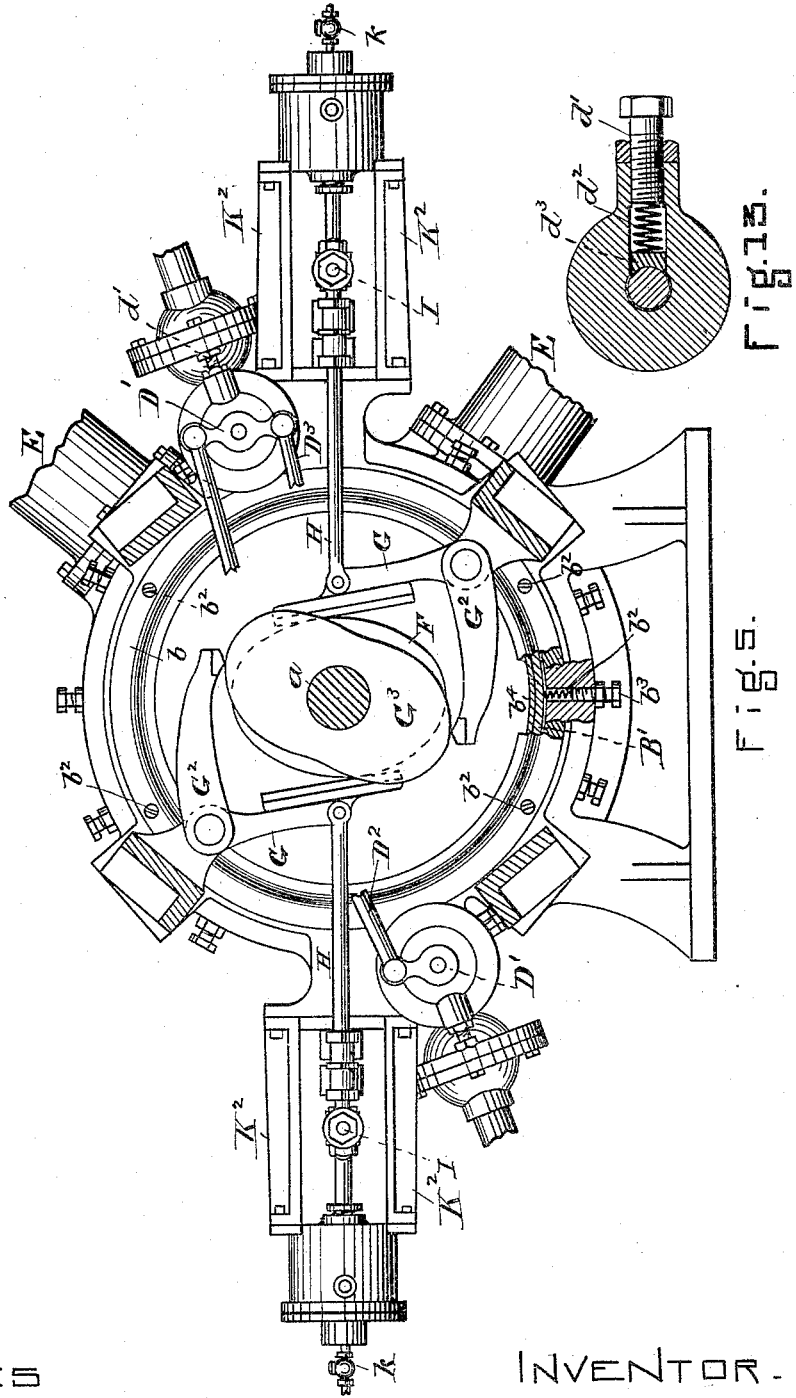
WITNESSES
Ellen B. Tomlinson.
John H. Taylor.
INVENTOR.
John W. Hayes
by Alex. P. Browne
attorney (No Model.)  6 Sheets—Sheet 6.
J. W. HAYES.
ROTARY ENGINE.
No. 444,834. Patented Jan. 20, 1891.
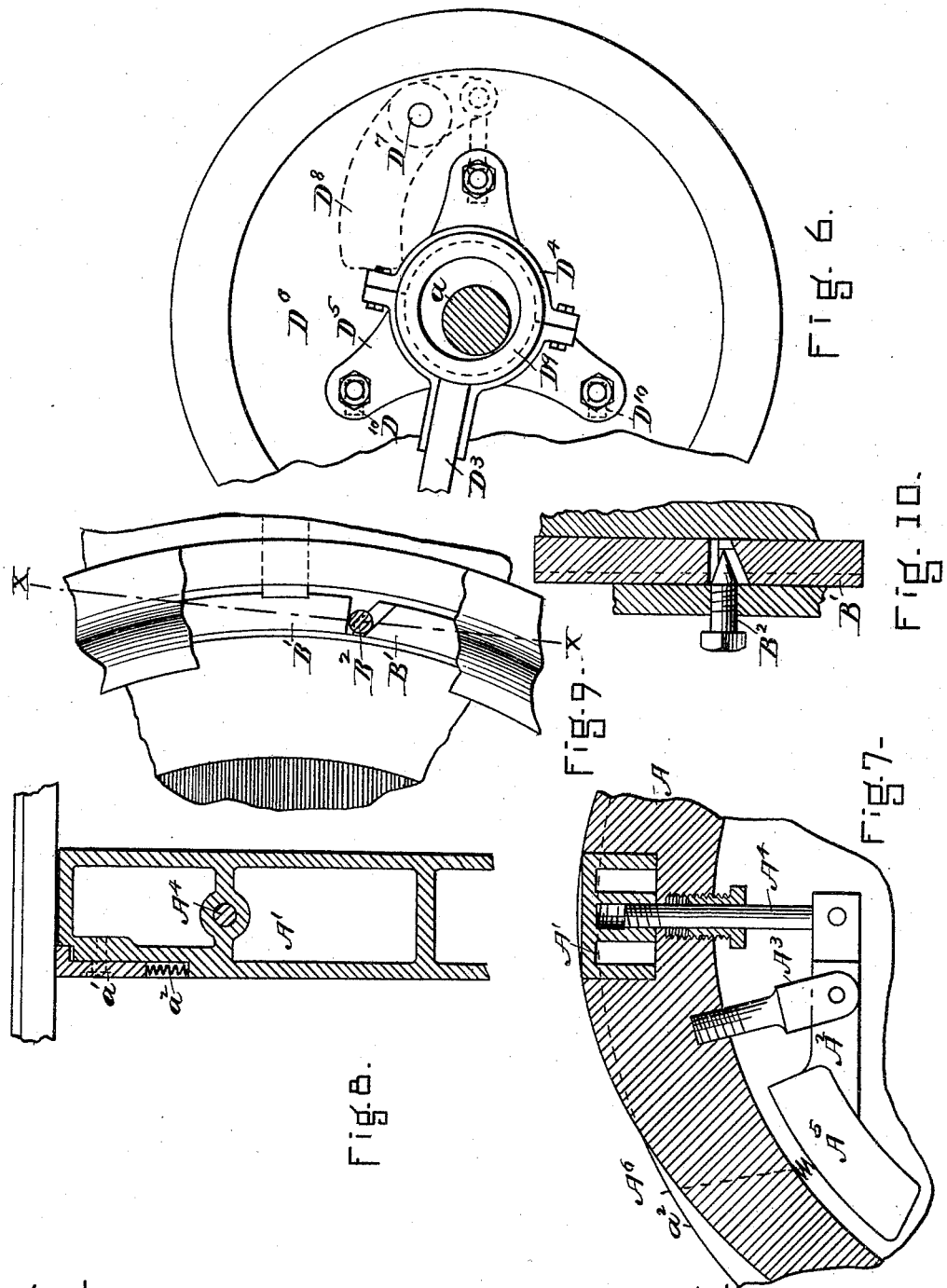
WITNESSES.
Ellen B. Tomlinson
John H. Taylor
INVENTOR.
John W. Hayes
by Alex. P. Browne,
attorney.

UNITED STATES PATENT OFFICE.

JOHN W. HAYES, OF PORTSMOUTH, NEW HAMPSHIRE, ASSIGNOR TO HIMSELF, MARCELLUS ELDREDGE, AND EDMUND S. FAY, OF SAME PLACE.

ROTARY ENGINE.

SPECIFICATION forming part of Letters Patent No. 444,834, dated January 20, 1891.

Application filed March 3, 1890. Serial No. 342,338. (No model.)

*To all whom it may concern:*

Be it known that I, JOHN W. HAYES, of Portsmouth, in the county of Rockingham and State of New Hampshire, a citizen of the United States, have invented certain new and useful Improvements in Rotary Engines, of which the following is a specification.

My invention relates to that type of motors in which power is developed by the application of force to a piston rotating within a cylinder, and commonly known as "rotary engines."

It relates particularly to that class of such devices in which a sliding piston-gate is employed in connection with the rotating piston.

The object of my improvement is to produce a machine particularly adapted to run at high speed and one which shall be economical in its use of steam.

Figure 1:
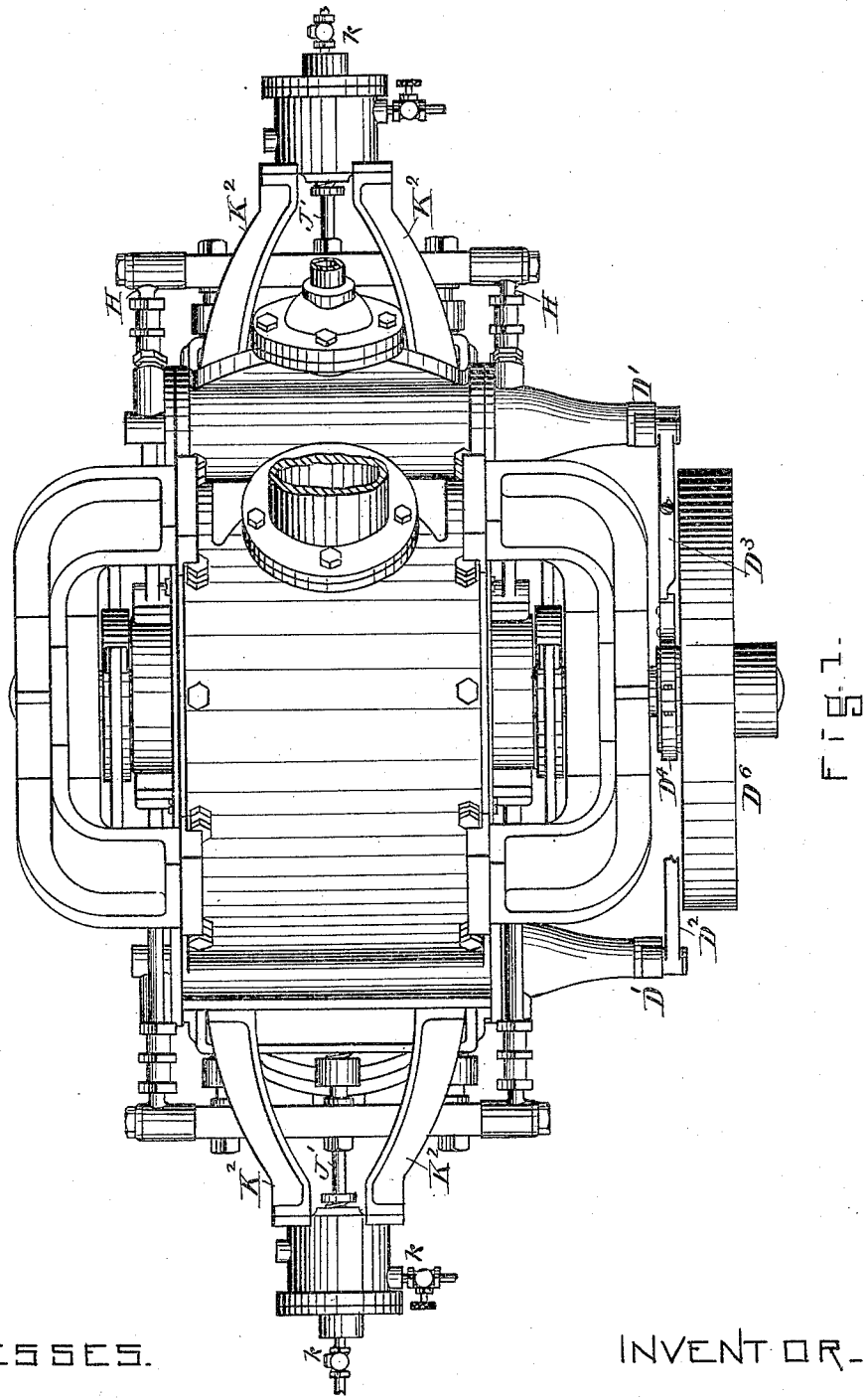
Figure 11:
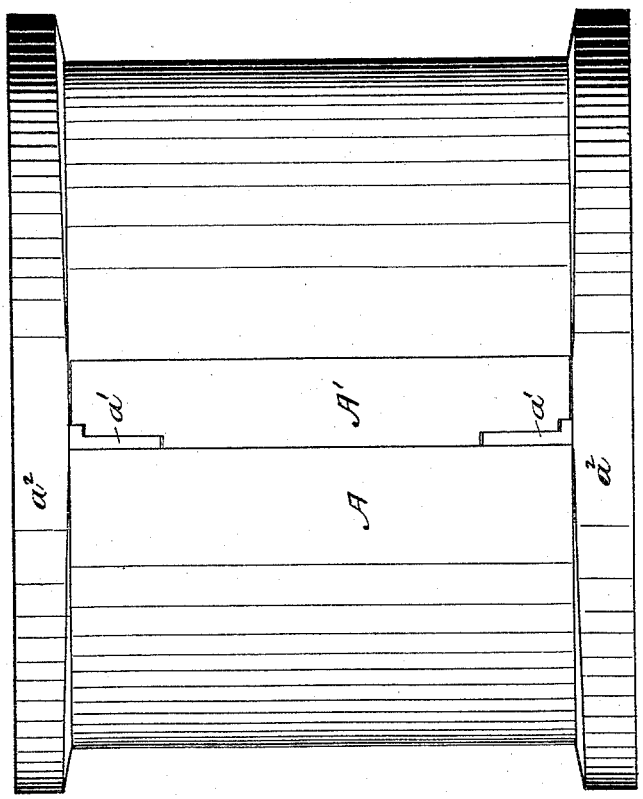
Figure 12:
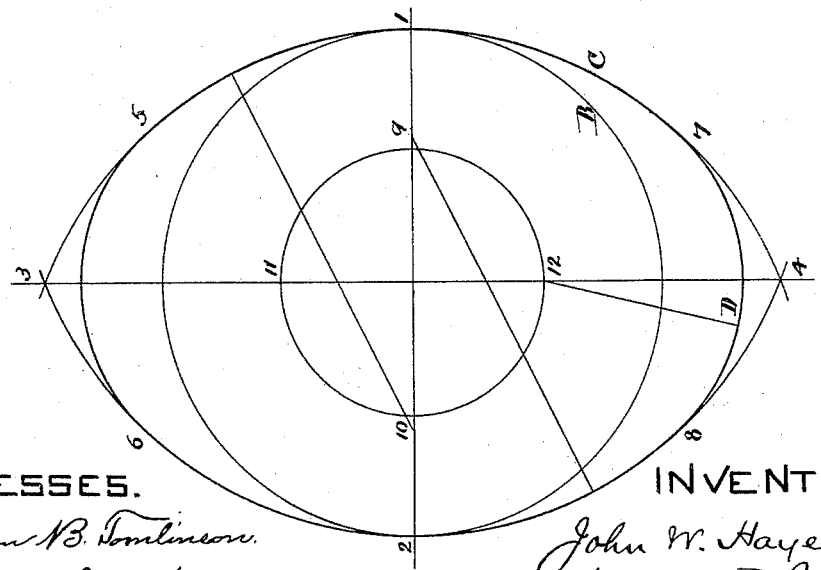

In the accompanying drawings I have represented at Figure 1 a plan view of a machine embodying my present invention in the form now best known to me. Fig. 2 is a longitudinal vertical section. Fig. 3 is a plan view of the piston. Fig. 4 is an enlarged view in horizontal section of the sliding piston-gate. Fig. 5 is an end elevation, the valve operating mechanism being omitted. Fig. 6 is a view of the valve-operating mechanism. Fig. 7 is a detail view, on an enlarged scale, of the piston-packing block and connected mechanism; and Fig. 8, a view in horizontal section of a portion of the block. Fig. 9 is a view of a portion of the piston-packing rings, and Fig. 10 a section of the same on the line x x of Fig. 9. Fig. 11, next to Fig. 4, is a detail view, in section, showing the arrangement of the gib, packing-rings, and outside covering-ring, as hereinafter explained. Fig. 12, next to Fig. 3, is a diagram illustrating method of laying out cam; and Fig. 13, next to Fig. 5, is a detail view, in section, of the devices for holding the valve-stems in place, as hereinafter described. Fig. 14 is a plan view of the valve itself.

I will first state what I believe to be certain novel principles involved in my present invention, and afterward proceed to describe in detail the mechanism represented in the drawings, in which these principles are embodied in a working form.

I do not make use of the rotating piston to control the position of the sliding piston-gate in any degree. I do this by means of a cam mounted upon the main shaft of the engine and a lever thrown by the cam and working the gate by means of an interposed connecting-rod. In laying out or planning an engine to embody my present improvement I have regard to the form of the cam and the location and throw of this lever, and determine the form of the piston therefrom. If I were to employ a yoke as the means of connection between the cam and the sliding piston-gate, then the contour of the piston would correspond with that of the cam. I do not, however, consider that such a construction would be operative, and therefore prefer to make use of the lever for this purpose and to vary the contour of the piston to the extent necessary to preserve the correspondence between it and the sliding piston-gate.

The mechanism hereinafter described is intended to embody the theory of the reciprocating engine as applied to one in which rotation is substituted for reciprocation. In the reciprocating engine there is a constant steam-pressure area—viz., that of the piston—and a varying rotative efficiency—viz., that of the crank. In carrying out my invention I give to the piston a contour such that in connection with the sliding piston-gate it shall produce a varying steam-pressure area within the cylinder corresponding to the varying rotative efficiency of the crank of the reciprocating engine. In the rotary engine there is a variable piston area and a constant piston speed.

In order that the contour of my piston shall vary as described I make it such that at each successive point in its revolution it shall correspond with the position of the sliding gate. This in turn is determined by means of a lever and cam operated from the main or piston shaft. I will first describe the method of laying out the cam and lever and of forming the piston whereby my rotary engine shall have a varying steam-pressure area within the cylinder corresponding to the varying rotative efficiency of the crank of a reciprocating engine as now ordinarily constructed, and consequently shall be more economical and efficient in use than previous rotary engines. Let it be assumed that I am required to construct a rotary engine equal in capacity per unit of time to a reciprocating engine of twelve-inch stroke and twelve-inch bore, making three hundred revolutions and cutting off at half-stroke with a boiler-pressure of eighty pounds. I first describe (see Fig. 12) a circle whose circumference equals in length the total piston travel per revolution of such an engine. The diameter 1 2 of this circle forms the least diameter of the main cam of my rotary engine. Next I lay off on the line 1 2 the points 9 and 10, distant respectively from the extremities 1 2 of the said diameter a distance equal to the length of the crank, and with those points as centers and with a radius equal to the length of the crank I describe intersecting arcs 3 1 4 and 3 2 4, as shown. Then I draw a line connecting the points 3 and 4, and necessarily bisecting the line 1 2. From centers 11 and 12 on this line 3 4, at a distance from its intersection with the line 1 2 equal to one-third of the length of the crank and with a radius equal to one-half of the said length, I describe the arcs 5 6 and 7 8, thus completing my cam. This cam so laid out has a throw equal to approximately one-sixth of the length of the line 1 2 and to one-fifth of the length of the crank, and the rate of travel of the piston-gate controlled by it will coincide with the rate of travel of the crank-engine above referred to. Therefore, to give to my rotary engine a capacity equal to that of the reciprocating engine I must revolve the piston with sufficient rapidity to move the sliding gate the same number of feet per minute as are traveled by the piston of the reciprocating engine.

The diameter of the cylinder of my rotary engine should be the length of the stroke of the reciprocating engine, and the length of its cylinder should be the diameter of the cylinder of the reciprocating engine. Should I wish to obtain the same capacity with a slower rate of revolution, both the diameter and the length of my cylinder would be increased in proper proportion.

The lever to be operated by the crank and to work the piston-gate through the connecting-rod should be of a length from its fulcrum to the point where the rod is pivoted upon it equal to that of the crank of the reciprocating engine. The position of its fulcrum or pivot is determined by measuring from the center of the piston-shaft upon a line at right angles to the path of motion of the sliding gate a distance equal to the length of the crank, and thence at right angles an equal distance toward the side where the gate to be operated is located. The lever is provided at its working end with a face toward the face of the cam, and of sufficient length to bear thereon and be operated thereby. When the position of the pivot of the lever is determined in accordance with the rule given above, its oscillation away from the center of the piston-shaft will not carry it materially past its vertical line, thereby causing the parts to work to the best mechanical advantage.

It has previously been stated that the piston is to have a contour such that at each successive point in its revolution it shall correspond with the position of the sliding gate, as determined by the lever and cam, and this without any injurious pressure of either upon the other. Of course the piston and gate are at all times pressed together with sufficient force to preserve a steam-tight joint between them, and for this purpose I have provided certain details of construction, which I will afterward describe; but it will be understood that the piston is not relied upon to move the gate or the gate the piston. To produce a piston of the desired contour I first take a cam and lever laid out and combined as described. Upon a shaft common to that of this cam I secure a block of metal having approximately the form of the finished piston. This block may be cast from a pattern, if desired. Then with a tool having the successive motions and successive positions of my sliding gate, and with its cutting-face corresponding to the bearing-edge of my gate, by rotating the piston-blank past the cutting-edge of this tool the metal of the blank is removed until its contour precisely corresponds to the successive positions of the gate itself. In this way, as it were, I make use of my cam-lever, connecting-rod, and gate, or its equivalent, the cutting-tool, as a mechanism to turn the face of my piston to the desired form, which it will do with positive accuracy. This manner of producing a piston and a machine in which the operation may be conveniently performed will form the subject of other applications for patent, and are not claimed herein.

I will now proceed to describe the structure shown in the drawings, in which my improvements are embodied in the form now best known to me.

In the machine represented in the drawings, A (see Figs. 2, 3, and 4) represents the piston, which is connected to and turns with its shaft $a$, from which shaft the power of the engine may be afterward taken off in any convenient manner. This piston, as represented in Fig. 4, is hollowed out as shown, both to diminish its mass and also to provide a convenient location within the hollowed portions for the mechanism hereinafter described for counterbalancing the piston-packing blocks. The piston surface which revolves within the cylinder is made up of two circular end portions $a^2$ $a^2$ of a width not materially greater than is required to be properly packed by packing-rings, as hereinafter described. The intermediate portion of the surface of the piston has a form not of a true circle, but such that it will correspond with the successive positions of a sliding piston-gate, which in turn are determined by a cam and lever, as already explained and hereinafter more fully described. At two points on the piston—viz., where its intermediate portion is packed against the opposed face of the cylinder—this portion is of slightly greater diameter than the circular ends, as indicated by the dotted line in Fig. 7; but between these points the diameter lessens in accordance with and to accommodate the movement of the gate. The piston rotates within a cylinder-case B, portions of which in connection with the sliding piston-gates C (which are more fully described later) act to form the cylinder of the piston. There are two of these gates and two main steam-valves D D and two exhausts E E, thus, as it were, duplicating the effective power of the steam-pressure upon the piston by reason of the fact, as will hereinafter appear, that the steam is applied, cut-off, and exhausted at correspondingly simultaneous periods to and from opposite sides or portions of the revolving piston. The result of this construction and mode of operation is that the piston-weight is made equal at all times on each side of its center, and this irrespective of variations in the load. Furthermore, friction is diminished by reason of the counterbalance between the thrust of the steam in opposite directions on opposite sides of the piston. The sliding gates C are packed against the face of the piston, and the face of the piston is packed against the cylindrical case B by means of packings, the particular construction of which will be hereinafter more fully described.

The main valves D D are provided with double supply-ports $d$ $d$, as shown, which simultaneously open or close a double steam-passage, as shown, located close to the sliding gate C. This construction is best shown in Fig. 2. This double construction of the supply-ports and steam-passages is very important. It is highly desirable in a rotary engine that reciprocating motions should be as small in extent as practicable, especially when the engine is intended to be run at high speed. Constructing the valves and steam-passages as described doubles the capacity of steam-admission without increasing the amount of motion of the valve. The exhaust-openings E are correspondingly located close to the sliding gates, each gate lying between a steam-supply and a steam-exhaust; but the steam supply and exhaust for each side of the piston is on the same side of the pair of gates. The sliding piston-gates C are moved inwardly, or toward the piston, by steam-pressure and outwardly, or away from the piston, by means of a cam F (see Fig. 5) turning upon the piston-shaft, which cam operates a lever G, fulcrumed, as shown, upon the frame of the machine. To this lever, at a point between its fulcrum and its bearing upon the cam, is pivoted a rod H, which at its other end is pivotally connected with the mechanism which carries the sliding piston-gate. It will be understood that this arrangement of cam, lever, and connecting-rod for each of the gates is provided at each side of the machine. As can be well seen from Figs. 1 and 4, the two rods H at their outer ends are pivotally connected to a cross-bar I, which in turn is carried by means of the rods J, which are attached to and move the sliding gate C. These rods slide in and out through suitable stuffing-boxes $j$, as shown. Further, in connection with the cross-bar I, I provide in its rear a piston-rod J', which may be a rearward continuation of the central rod J. This piston-rod carries a piston K, moving within a steam-cylinder K', which may be conveniently supported upon brackets $K^2$, extending from the frame of the machine, as shown at Fig. 1. In the rear of this cylinder is a steam-entrance $k$, provided with an inwardly-opening check-valve, and at a point in the cylinder nearer to its front portion I provide a second steam-entrance $k'$, having an ordinary valve or one through which steam may pass in both directions. Again, at a point yet nearer to the front or innermost end of the cylinder, I provide an unvalved exit hole or aperture $k^2$. The cylinder K', at different points of its stroke both opens and closes the passages $k'$ and $k^2$, all for a purpose that will be hereinafter more fully described. The gates C slide in gibs $c^2$, made adjustable by means of screws $c^3$ to take up wear.

The packing face or end of the sliding gate C consists of a packing-bar C', made separate from the gate C and adapted to play slightly both inwardly and outwardly and also laterally with reference to the inner end of the gate. The inner ends of the gibs $c^2$ are recessed, as shown, to permit this lateral play, and the packing-bar C', being pressed by the steam against and sliding upon one face of the recess in the gibs, is packed thereby against the leakage of steam at this point. The outer or bearing face of the bar C' is preferably made like the head of a T, (see Fig. 2,) thus giving an increased wearing surface against the piston. The bearing portion of this packing-bar C', I make tapering inwardly at its extremities $c$, as shown. The object of this construction is to enable the bar to take up its own wear and that of the opposed portion of the piston, whose face where it comes against the bar is similarly tapered, and a light spring or springs $c'$, interposed between the bar and the slide, tend to press the bar forward and against the piston. This packing-bar, being pressed out, as described, by spring-pressure, is forced back, or in the other direction, by the piston as it revolves.

The packing-blocks A' of the piston and their connected mechanism are shown on an enlarged scale at Figs. 7 and 8. Each of these blocks extends nearly across the face of the piston (see Fig. 3) and the bearing-face of each block is composed of suitable packing material and packs directly against the inner face of the cylinder. The packing-blocks themselves are made slightly less in width than the outside width of the cylinder; but at each side of the block I form a supplemental sliding block $a'$, (see Figs. 3 and 8,) which is adapted to slide laterally upon the face of the block proper and is kept pressed out toward the side of the packing-ring $B'$, hereinafter described, by a spring $a^2$. One of these supplemental blocks $a'$ is provided at each end of the main packing-block $A'$. As it is obvious that as the speed of the piston increases the packing-blocks $A'$ will be pressed out very strongly by centrifugal force, I provide, in order to neutralize this, a pair of levers $A^2$, one at each end of the piston, the ends of which are recessed to permit the insertion of the levers and their connected mechanism. Each of these levers $A^2$ is fulcrumed upon a post $A^3$, connected to the piston, as shown at Fig. 7. One end of the said lever $A^2$ is pivoted to a rod $A^4$, which, passing through a suitable sliding bearing in the shell of the piston, is connected to the packing-block near its end. The opposite end of the lever $A^2$ is weighted, as indicated at $A^5$, so that as the centrifugal force increases the pull of $A^5$, transmitted through the lever $A^2$, shall very nearly balance the pull upon the rod $A^4$, transmitted from the packing-block to the lever $A^2$ on the other side of its fulcrum. A light spring $A^6$, as shown, under the weighted end $A^5$ of the lever $A^2$, may be employed to press the block $A'$ out to prevent leakage when the machine is at rest or moving slowly. By this means and the regulation of the weight of $A^5$, I can cause the packing-block $A'$ to press outward with any required degree of force less than its normal centrifugal force. It will be understood that this arrangement of the weighted lever with its fulcrum and rod $A^4$ is repeated at each end of the packing-block, the piston being hollowed out at each end to receive the mechanism for that end of the packing-block.

The cylinder-case B is provided at each end (see Fig. 5) with a ring $b$, flanged as shown at $b'$, (see Fig. 4,) attached to it by means of screws $b^2$ (see Fig. 5) or in any other convenient manner. Each end of the cylinder is recessed to form a circular notch or groove, within which is placed a packing ring or strip $B'$. The rings $b$ serve to hold the packing-rings $B'$ in place, and the flanges $b'$, lapping over and covering the edges of the piston, as shown, prevent the oil, water, &c., from being thrown out from the machine by centrifugal force. These packing-rings are shown in section at Fig. 4, and a detail of their construction is represented at Figs. 9 and 10. I make each of them in two parts, each part embracing substantially one-half of the circumference of the cylindrical rim $a$ of the piston. One end of each of these parts is held against motion around the piston in any suitable manner. This may be done by having the inner ends of the gib-pieces $c^2$, in which the gates C slide, enter into notches formed in the packing-rings $B'$, as shown at Fig. 9. The opposite ends of each of the parts are made tapering, as shown at Fig. 10, and in connection with such taper I provide a wedging-screw $B^2$. One object of these packing-rings being to pack the outer edges or rims $a^2$ of the piston, they are held up against them by springs $b^2$, the tension of which springs is regulated by set-screws $b^3$, passing through the cylinder. (See Fig. 5, where a portion of the end of the cylinder is broken away to show this.) By turning in the wedging-screw $B^2$, I am enabled to relieve the pressure of the packing-rings upon the piston under the tension of the springs. On the other hand, as the ring and piston wear the taper of the end of the ring coacting with the wedge face of the screw will allow the ring to come up to the piston under pressure of the springs $b^2$. In this way I am enabled to closely adjust the pressure of the packing on the piston, and thus to prevent excessive friction, as well as to allow for wear.

Within the packing-rings $B'$ are auxiliary rings $b^4$, (see Fig. 11,) each made in one piece, but not continuous. Each of these auxiliary rings surrounds an outer edge of the piston, and steam is admitted behind them through an orifice $b^5$ in the ring $B'$ to pack them tightly against the piston. The sides of the rings $B'$ serve to pack the supplementary sliding blocks $a'$, above described. By reason of this method of making the packing for the edges of the piston independent of that for the central main body I obtain important features of advantageous operation, especially in the way of preventing leaking of steam and wear on the packing surfaces. The rings $B'$ are slotted to allow the packing-bar $C'$ to play through them, and at these points serve to pack the bar. The gates C, as shown in dotted lines, are enough narrower than the bar $C'$ to work past the inner faces of the packing-rings $B'$ and also past the inner faces of the gibs $c^2$, which are flush with those of the rings $B'$.

The valves D, which admit and cut off the steam, are represented in section at Fig. 2, and in plan, on an enlarged scale, at Fig. 14. To oscillate the valve D to admit and cut off steam from the piston, I attach to the shaft or stem of each valve a lever D, (see Fig. 5,) and connect the levers of the two valves at either end of the cylinder by means of a connecting-rod $D^2$, which in the figure referred to is shown as broken away to give a view of other parts of the mechanism. In connection with the stem of each valve, and at each end thereof, there is provided a device to keep the valve down on its seat, which consists of a set-screw $d'$, set in the steam-chest cover, a spring $d^2$, and a block or follower $d^3$, (see Fig. 13,) adapted to bear upon the stem when the spring is compressed by the screw. In this way the tendency of the valve to lift from its seat is overcome.

To operate the valves I attach to one of the levers $D'$ an operating-rod $D^3$. Upon the other end of the rod $D^3$ (see Fig. 6) is formed a circular strap $D^4$, surrounding an eccentrically-set collar $D^9$ upon a plate $D^5$, which plate is in slotted connection, as shown, with a disk $D^6$, attached to and rotating with the shaft of the piston. The slots $D^{10}$, in which the plate moves, are so located relatively to the center of the disk that the amount of the least eccentricity of the plate relative to the disk will equal the lap and lead of the valve. The collar $D^9$ is provided with a flange, as indicated by the dotted line, (which shows the inner line of the strap $D^4$,) to hold the strap in its place around the collar. Pivoted upon this disk at $D^7$ is a weighted lever. (Shown in dotted lines and marked $D^8$.) One extremity of this lever is made fast to the plate $D^5$, which, by virtue of its slotted connection with the disk $D^6$, is adapted to slide radially upon the same. The other end of the lever $D^8$ is weighted, as shown, and as the disk $D^6$ revolves with increasing speed the centrifugal force exerted upon the weighted end of the lever $D^8$ tends to slide the plate $D^5$ more toward the center of the disk. As this plate carries the collar $D^9$, which surrounds the main shaft of the piston and is set slightly eccentric thereto, as explained, it is obvious that at each revolution of the disk $D^6$ the collar $D^9$ will operate to impart a reciprocating motion to the connecting-rod $D^3$, to which the strap is attached. The extent of this motion will be determined by the position of the weighted lever $D^8$, as before explained. Hence the structure operates at once as an eccentric, governor, and cut-off.

I will now proceed to describe the operation of the various parts which give the requisite motions to the sliding gate C. It will be remembered that this gate is carried outwardly, or away from the axis of the piston, by the operation of the cam F, the lever G, and connecting-rod H. It is returned by steam-pressure applied to the outer or back side of the piston K within the cylinder K'. (See Fig. 4.) It is evident that considerable forces, due to the inertia and momentum of the gate C and connected moving parts, must be neutralized at each change of its direction, and I do this in the following manner: Assuming the gate C to be at its innermost position and to start to move outwardly, the piston K will at first be resisted by the steam-pressure of the boiler within the cylinder K'; but when the piston is moved far enough to close the passage $k'$ the only access of steam then remaining to the cylinder being that through the passage $k$, which, it will be remembered, is provided with an inwardly-opening check-valve, this valve will be closed under the pressure exercised by the piston K. The result will be the confining of a body of steam within the cylinder K' and back of the piston K, which at the end of its travel or when the momentum is greatest will act as a cushion to check it. Again, on its return stroke, when the piston K is free to move in the other direction, it will first do so under the elasticity of the compressed-steam cushion and afterward under boiler-pressure, the air in front of the piston being expelled through the passage $k^2$. When, however, the piston K, advancing, has closed this passage, there will still be a body of air confined between it and the forward end of the cylinder, which will serve as a cushion to take up the momentum at this end of its stroke, and also again will aid to start it in moving back. The maintenance of this steam-pressure in the rear of the gate is of great practical value, because it serves at all times to hold the face of the lever G up to its operating-cam F, and also to overcome any tendency of these parts to separate on account of the momentum of the gate and connecting-rod. The steam-pressure also, as has been said, is effectual in moving the gate in one direction—viz., inwardly, or toward the center of the cylinder.

As an auxiliary to the structure above described, I may provide a supplementary arm G' (see Fig. 5) to the lever $G^2$, thereby converting it into a bell-crank lever, which arm engages at its extremity with a cam $G^3$, by which cam and lever the inward motion of the gate C may also be obtained.

I claim—

1. In a rotary engine having a sliding piston-gate, a cam for controlling the motion of said gate, having a least diameter equal to the diameter of a circle whose circumference is of the length of the total piston travel per revolution of a reciprocating engine of any given or assumed capacity and having an outline formed of two arcs tangent to the said circle, their radii being of the length of the crank of the said reciprocating engine, and their centers lying in the said least diameter, and of two arcs having radii equal to one-half the length of the said crank, the centers of the two last-named arcs being in a line drawn through the middle point of said diameter and at right angles thereto, and distant from said middle point one-third of the length of the said crank, as set forth.

2. In a rotary engine having a sliding piston-gate, the combination, with a cam having the contour herein described, of a pivoted lever, a connection pivoted to the said lever at its free end and connected with the gate, and a face mounted upon the said free end of the lever opposite the said connection and bearing upon and operated by the said cam, substantially as set forth.

3. In a rotary engine having a sliding piston-gate, the combination, with a cam having the contour described, of a lever connected with and adapted to operate the said gate and having a face bearing upon and operated by the said cam, the said lever from its fulcrum to the point of its connection to the sliding gate being of a length equal to the length of the crank of the reciprocating engine with reference to which the said cam is laid out, and the fulcrum of the said lever being located with reference to the center of the said cam in a line drawn through the same at an angle of forty-five degrees to the vertical or horizontal and at a distance therefrom equal to the square root of twice the square of the length of said crank, as set forth.

4. In a rotary engine, the combination, with a sliding piston-gate and a cam having the contour herein described, and lever constructed substantially as described, whereby the successive positions of the said gate are determined, of a piston having a common shaft with the said cam and having that portion of its face opposed to said gate of a contour to correspond, when the piston is rotated, to the successive positions of the said gate as determined by the said lever and cam.

5. In a rotary engine having a sliding piston-gate and revolving piston, the combination of a cam mounted upon a shaft common with that of the piston, a lever operated by the cam, a connecting-rod from the lever to the gate, whereby the said gate is moved outwardly, or away from the piston, by the said cam, a steam-cylinder and a piston working therein and connected to the gate, and a steam-passage into the said cylinder in the rear of the piston or upon the side thereof farthest from the gate, whereby steam introduced into the said cylinder may operate to hold the lever at all times against the opposed face of the cam, substantially as and for the purposes set forth.

6. In a rotary engine, the combination, with the sliding gate, of an air and steam cushioning chamber, whereby the gate is cushioned by steam at the end of its outward travel and by air at the end of its inward travel, as set forth.

7. In a rotary engine having a sliding piston-gate, the combination, with the said gate, of a piston K and cushioning-cylinder K', provided with steam-ports $k$ and $k'$ and air-port $k^2$, as described.

8. In a rotary engine, the combination, with a piston having its face tapered or recessed, as described, of a sliding piston-gate provided at its end next the said piston with a supplemental gate-block adapted to play as described, and tapered or beveled to fit the said tapered or recessed portion of the piston, as described.

9. In a rotary engine, the combination, with a sliding piston-gate C, of a supplemental gate-block C', fitted to its inner end, as described, and adapted to play both inwardly and outwardly and laterally with respect thereto, and a spring $c'$, interposed between the inner end of the said sliding piston-gate and the supplemental gate-block to press the latter toward the face of the piston, as set forth.

10. In combination, the sliding piston-gate C, supplemental gate-block C', spring $c'$, and gibs $c^2$, recessed at their inner ends to permit lateral play to the supplemental gate-block, as described.

11. In a rotary engine, a piston having its working-face formed with cylindrical outside portions and its intermediate portion made at two opposite points of slightly greater diameter than the said circular portion and gradually lessening between these points, as described, and for the purpose set forth.

12. In a rotary engine, a cylindrical piston having its working-face formed with cylindrical outside portions and an internal non-cylindrical or cam formed and recessed portion, the walls of the said grooved or recessed portion being tapered or beveled outwardly or toward the said cylindrical portions, as described, in combination with a sliding gate provided with a supplemental gate-block separate from said gate and having a similarly-tapered end portion to enter and match the said recess, as set forth.

13. In a rotary engine, the combination of the piston A, with hollowed-out portions, as described, a packing-block A', provided with supplemental sliding blocks $a'$, levers $A^2$, posts $A^3$, and weights $A^5$, located within the hollowed-out portions, and rods $A^4$, pivoted to the said levers at their end opposite the said weights and connected to the said packing-blocks, as set forth.

14. In a rotary engine, the packing herein described, composed of the semicircular rings B', having one end secured as described, springs $b^2$, and tapering screw B, located at the free ends of said springs, as described.

15. In a rotary engine, the combination of main packing-rings B', recesses therein, supplementary packing-rings $b^4$, located in said recesses, springs $b^2$ and set-screws $b^3$ for pressing the said packing-rings B' against the piston by spring-pressure, and steam-passages $b^5$, passing through said main packing-rings and leading to the recesses containing the supplemental packing-rings, whereby the latter are packed upon the piston by steam-pressure, substantially as set forth.

16. In a rotary engine, the combination, with the cylinder-case B and packing-rings B', of the rings $b$, provided with flanges $b'$, overlapping and covering the corners of the piston, as shown, said rings serving to hold the packing in place and said flanges to prevent the outward escape of fluid, as described.

17. In combination, the piston A, having the circular portions $a^2$ and intermediate recessed portion, the sliding piston-gate C C', gibs $c^2$, packing-rings B' $b^4$, recessed cylinder B, and retaining-rings $B^3$, as described.

18. In a rotary engine, the combination, with a piston, of piston packing-blocks provided with laterally-movable supplemental packing-pieces $a'$, as described.

19. In combination, the piston A, having the circular end portions $a^2$, piston packing-blocks A', supplemental blocks $a'$, packing-rings B', recessed cylinder B, and retaining-rings $B^3$, as described.

20. In a rotary engine, the combination, with the stem of the valve D, of the set-screw D', set in the steam-chest, covered spring $d^2$, and the follower $d^3$, bearing upon the stem of the said valve, whereby the spring may be
5 compressed by the screw to force the follower down upon the valve-stem to hold the valve in place, as set forth.

In testimony whereof I have hereunto subscribed my name this 27th day of February, A. D. 1890.

JOHN W. HAYES.

Witnesses:
CALVIN PAGE,
AGNES PAGE.